United States Patent
Sayo et al.

[11] Patent Number: 6,099,897
[45] Date of Patent: Aug. 8, 2000

[54] METHOD FOR PRODUCING METAL PARTICULATE DISPERSION AND METAL PARTICLE-CARRYING SUBSTANCE

[75] Inventors: Koichi Sayo; Shigehiko Hayashi, both of Hyogo; Kazuo Goto, Higashiosaka; Shigehito Deki, Hyogo, all of Japan

[73] Assignee: Mitsuboshi Belting Ltd., Hyogo, Japan

[21] Appl. No.: 09/014,157

[22] Filed: Jan. 27, 1998

[30] Foreign Application Priority Data

Jan. 29, 1997 [JP] Japan .................................... 9-031340
Feb. 18, 1997 [JP] Japan .................................... 9-050891

[51] Int. Cl.[7] .................................................. C23C 16/06
[52] U.S. Cl. .......................... 427/180; 427/216; 427/220; 427/250; 427/337; 427/353; 427/413.2; 427/430.1
[58] Field of Search ..................................... 427/180, 205, 427/248.1, 250, 337, 353, 190, 191, 443.2, 430.1, 216, 220

[56] References Cited

U.S. PATENT DOCUMENTS

| | | | |
|---|---|---|---|
| 3,914,471 | 10/1975 | Cobb et al. | 427/250 |
| 4,321,087 | 3/1982 | Levine et al. | 75/0.5 A |
| 4,338,132 | 7/1982 | Okamoto et al. | 75/208 R |
| 4,521,444 | 6/1985 | Ponjee et al. | 427/41 |
| 4,670,350 | 6/1987 | Rukavina | 428/520 |
| 5,418,056 | 5/1995 | Noguchi et al. | 428/323 |

*Primary Examiner*—Timothy Meeks
*Attorney, Agent, or Firm*—Wood, Phillips, VanSanten, Clark & Mortimer

[57] ABSTRACT

A method of producing metal particles, including the steps of forming a membrane of a polymer or oligomer which has, at the terminals of its molecule and/or in the side chains thereof, at least one functional group selected from cyano, amino and thiol groups, and depositing a metal on the membrane through vapor deposition so that the membrane has particles of the metal and/or its oxide dispersed therein.

14 Claims, 3 Drawing Sheets

(1) TITANIUM OXIDE WITH GOLD PARTICLES FIXED THEREON.

(2) TITANIUM OXIDE ALONE.

(3) TITANIUM OXIDE THAT HAS ADSORBED ON ITS SURFACE A DISPERSION OF GOLD PARTICLES IN NYLON 11 OLIGOMER.

METHOD FOR PRODUCING METAL PARTICULATE DISPERSION AND METAL PARTICLE-CARRYING SUBSTANCE

BACKGROUND OF THE INVENTION

1. Field of the Invention

The present invention relates to a method for producing metal particles and a metal particulate dispersion, and to a method for producing a metal particle-carrying substance. Metal particles are dispersed within a polymer or oligomer membrane. Specific functional groups existing at the terminal ends of the polymer or oligomer and/or in the side chains thereof interact with particles of the metal and/or its oxide to inhibit the aggregation and growth of the particles and cause relatively uniform distribution in the membrane. The membrane can then be dissolved to produce a metal particulate dispersion to which a carrier is added. The unaggregated metal particles are absorbed by the carrier and become fixed on its surface.

2. Background Art

Several conventional methods are known for producing metal particles in a solution or in a gaseous phase. One conventional method of forming particles involves the dissolving of a compound such as chloroauric acid in an aqueous solution followed by the addition of a reducing agent to colloidize the metal ions in the solution. This is problematic, however, because the formed metal particles are unstable (requiring the addition of a stabilizing surfactant) and the solution contains impurities such as the reducing agent.

Conventional methods of forming metal particles in a gaseous phase include (1) depositing particles of a metal on a substrate through vaporization of the metal and peeling of the particles from the substrate, (2) contacting vaporized metal with a surfactant vapor to give a metal colloid, and (3) trapping vaporized metal particles on an oil. There are problems associated with these gas phase methods. In the first method, the particles which are formed cannot be dispersed for any other use. In the second and third methods, the metal particles are difficult to stabilize and tend to aggregate.

Japanese Patent Publication No. 6-99585 discloses another method which consists of melting a polymer material and then rapidly resolidifying it to give a thermodynamically unstable polymer layer on which a metal film is deposited. Particles of the metal or its oxide then disperse throughout the polymer layer as it stabilizes. However, it is difficult to increase the concentration of the dispersed particles.

SUMMARY OF THE INVENTION

The present invention addresses these problems by providing a method for producing metal particles and a dispersion of the particles in a polymer or oligomer having specific functional groups which inhibit particle aggregation and growth. This dispersion is then applied to a carrier which absorbs the metal particles on its surface.

The invention contemplates a method of producing metal particles, including the steps of forming a membrane of a polymer or oligomer which has, at the terminals of its molecule and/or in the side chains thereof, at least one functional group selected from cyano, amino and thiol groups, and depositing a metal on the membrane through vapor deposition so that the membrane has particles of the metal and/or its oxide dispersed therein.

The method may further include the step of heating the membrane after metal is deposited thereon to improve the dispersion of the particles of the metal and/or its oxide in the membrane.

The metal to be deposited may be a noble metal.

The step of forming a membrane may include the steps of applying, onto a substrate, a paste of a polymer and/or oligomer dissolved in an organic solvent, which polymer or oligomer has, at the terminals of its molecule or in the side chains thereof, at least one functional group selected from cyano, amino and thiol groups.

The step of forming a membrane may involve the step of forming a synthetic polyamide through polymerization to have a molecular weight of from 400 to 7,000, dissolving the polyamide in the solvent, and filming the polyamide onto a substrate.

In one form, the synthetic polyamide has a molecular weight between 400 and 7,000 and is formed through polymerization of an amino acid monomer of the formula $H_2N—(CH_2)_n COOH$ (where n is from 1 to 36) with at least one polymerization inhibitor in the presence of a catalyst, wherein the polymerization inhibitor is selected from amines or polyamines having an amino group at the terminal(s) of their molecule and represented by the formula $R—(CH_2)_m—NH_2$ (where m is from 1 to 36 and R is a group selected from $CH_3—$, cyano, amino and thiol groups), or amines or polyamines of the same formula but having in their side chains at least one or more functional groups selected from cyano, amino and thiol groups.

The invention also contemplates a method for producing a metal particulate dispersion, including the steps of forming a membrane of a polymer or oligomer which has, at the terminals of its molecule and/or in the side chains thereof, at least one functional group selected from cyano, amino and thiol groups, and of which the skeleton is soluble in water, depositing a metal on the membrane through vapor deposition to cause the membrane to have particles of the metal and/or its oxide dispersed therein, and dissolving the resulting composite in water or in an aqueous solvent miscible with water.

The polymer or oligomer may have a skeleton of polyethylene oxide, polyethylene glycol or polyvinyl alcohol.

The invention further contemplates a method for producing a metal particle-carrying substance, including the steps of forming a membrane of a polymer or oligomer which has, at the terminals of its molecule and/or in the side chains thereof, at least one functional group selected from cyano, amino and thiol groups, depositing a metal on the membrane through vapor deposition to cause the membrane to have particles of the metal and/or its oxide dispersed therein, dissolving the resulting composite in a solvent to produce a metal particulate dispersion, and placing a carrier into the metal particulate dispersion to absorb the metal particles via a polymer or oligomer.

The invention may further include the step of heating the carrier having the particles absorbed therein, via the polymer or oligomer at a temperature not lower than the decomposition point of the polymer or oligomer.

The carrier may be at least one inorganic oxide selected from silica, alumina, zeolite, titanium oxide, zirconia and heteropoly-acids.

The invention further contemplates a method of producing a metal particle-carrying substance including the steps of forming a membrane of a polymer or oligomer which has, at the terminals of its molecule and/or in the side chains thereof, at least one functional group selected from cyano, amino and thiol groups and of which the skeleton is soluble in water, depositing a metal on the membrane through vapor deposition to cause the membrane to have particles of the metal and/or its oxide dispersed therein, and dissolving the resulting composite in the water or an aqueous solvent miscible with water.

DETAILED DESCRIPTION OF THE PREFERRED EMBODIMENTS

Figure 1:
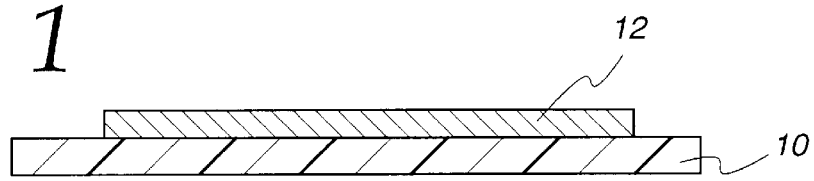
FIG. 1 is a cross-sectional view of a substrate coated with a polymer or oligomer membrane.
Figure 2:
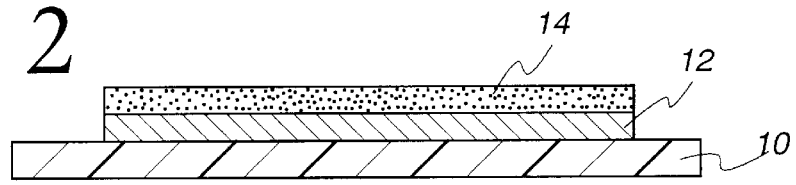
FIG. 2 is a cross-sectional view of a polymer- or oligomer-coated substrate with a layer of metal atoms deposited on the polymer or oligomer.
Figure 3:
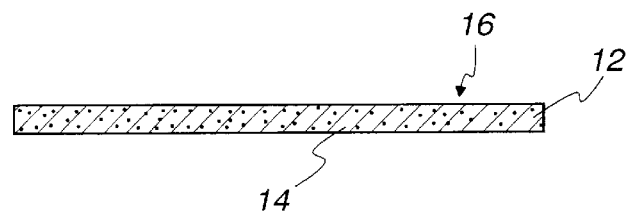
FIG. 3 is a cross-sectional view of a composite having a polymer or oligomer membrane with a dispersed metal and/or its oxide.
Figure 11:
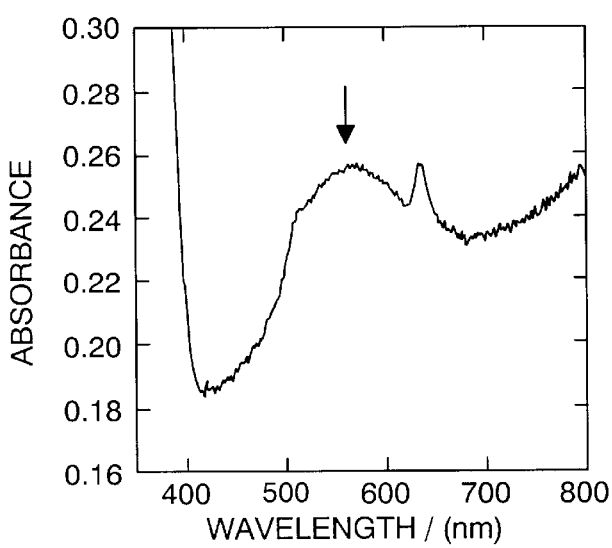
FIG. 11 is the visible ray absorption spectrum of the powder prepared in Example 3, described hereinbelow, with titanium oxide powder with gold particles fixed on its surface.

FIGS. 1–3 show a process for producing particles according to the invention. As shown in FIG. 11 initially a paste prepared by dissolving a polymer or oligomer in an organic solvent is applied onto a substrate 10 to form a polymer or oligomer membrane 12 thereon.

The polymer or oligomer has, at the terminals of its molecular structure and/or in the side chains thereof, at least one functional group selected from cyano (—CN), amino (—NH$_3$) and thiol (—SH) groups. Its skeleton may be any of polyethylene oxide, polyethylene glycol, polyvinyl alcohol, nylon 11, nylon 6, nylon 66, nylon 6.10, polyethylene terephthalate, polystyrene, and the like. The polymer or oligomer may have a melting point or a softening point falling between 40 and 100° C. The mean molecular weight of the oligomer is not specifically limited, and may fall between 500 and approximately 3000.

The functional groups of the polymer or oligomer easily form covalent or coordination bonds with the metal atoms existing on the surface of the particles formed, while inhibiting the growth of the particles to thereby improve the dispersibility of the particles. Particular polymers and oligomers—those having a skeleton of polyethylene oxide, polyethylene glycol or polyvinyl alcohol—are soluble in water or in an aqueous solvent miscible with water such as acetone or alcohol. These polymers and oligomers are preferably used to produce a dispersion of metal particles in solution without particle aggregation.

Returning to the membrane 12, another membrane formation method is employable in which a synthetic polyamide is prepared through polymerization to have a molecular weight between 400 and 7000. The polyamide is then dissolved in a solvent and the resulting solution is applied onto a substrate to form a membrane thereon. In this case, if the synthetic polyamide has a molecular weight lower than 400, it easily vaporizes when reduced pressure is employed for the vapor deposition of a metal onto the membrane. If the synthetic polyamide has a molecular weight greater than 7000, particles of a metal or its oxide are difficult to disperse in the polyamide. The molecular weight of the synthetic polyamide is measured via a gel permeation chromatography device (manufactured by Shimazu Seisakusho Ltd.). A synthetic polyamide sample is partitioned and analyzed in a gel permeation chromatography column using a mobile phase of chloroform alone or a mixture of chloroform and meta-cresol in a 4:1 weight ratio. The result is compared with a commercially-available standard sample—polystyrene—with respect to the column retention time to thereby obtain the molecular weight of the synthetic polyamide sample.

One typical method of forming the synthetic polyamide involves polymerizing an amino acid monomer of the molecular formula H$_2$N—(CH$_2$)$_n$COOH (where n is from 1 to 36) with at least one polymerization inhibitor. The inhibitor is selected from amines or polyamines having an amino group at the terminal(s) of their molecule and represented by the formula Rl(CH$_2$)$_m$—NH$_2$ (where m is from 1 to 36 and R is a group selected from CH$_3$—, cyano, amino and thiol groups), or amines or polyamines of the same formula but having in their side chains at least one or more functional groups selected from cyano, amino and thiol groups. The polymerization reaction is conducted in the presence of a catalyst in a solvent such as N-methylpyrrolidine or dimethylacetamide, with stirring taking place at an elevated temperature of 100–150° C. and with the introduction of nitrogen gas. The polymerization system is then cooled to room temperature after completion of the polymerization. The reaction product is poured into ethyl acetate, toluene, hexane or the like, and left for one full day to give a precipitate which is collected through filtration. The precipitate is washed and then dried at 40–70° C.

The amino acid monomer might be, for example, 11-amino-undecanoic acid or 9-amino-nonanoic acid. The polymerization inhibitor might be, for example, hexamethylene-diamine, ϵ-aminocapronitrile or ethylene-diamine. Possible catalysts include quinoline and triphenyl phophite, among others.

After the polymer or oligomer membrane 12 is formed on the substrate 10, metal particles 14 are deposited on the membrane 12 through vapor deposition (see FIG. 2) using a vacuum vapor deposition device. The deposition takes place in a vacuum having a vacuum degree of from $10^{-6}$ to $10^{-4}$ Torr and at a deposition rate of from 0.1 to 100 μm/min, and preferably from 0.5 to 5 μm/min. The metal to be used may include, for example, copper, gold, silver, platinum, palladium, iron, nickel, cobalt, tin, zinc, cerium or yttrium. Of these, the noble metals such as gold, silver and palladium are preferred.

The deposited metal has particles 14 of the metal and/or its oxide. Some of the particles 14 penetrate into the membrane 12 and disperse therein. The interface between the layer of the particles 14 and the membrane 12 does not form any definite boundary. During the vapor deposition, the membrane 12 formed on the substrate 10 is preferably heated to promote the dispersion of the metal or metal oxide particles 14 into the membrane 12.

After deposition of the metal, the membrane 12 is heated. Preferably, it is heated at a temperature which is not more than 10 to 40° C. lower, and not more than 5 to 10° C. higher than the melting point or softening point of the polymer or oligomer membrane 12. The heating promotes the uniform dispersion of the metal particles 14 within the membrane 12, which may come to have a metal concentration of 20% by weight, or more. In this step, the particles 14 interact with the polymer or oligomer of the membrane 12 to exhibit an intrinsic color which indicates the penetration of the particles 14 into the polymer or oligomer membrane 12. The color varies, depending on the type of the metal and/or its oxide deposited, the size of the metal and/or metal oxide particles formed, and the type of polymer or oligomer used. The particles, however, are independently separated from one another and dispersed through the membrane 12. Depending on the metal and polymer or oligomer chosen, it may not always be necessary to heat the membrane 12.

Figure 4:
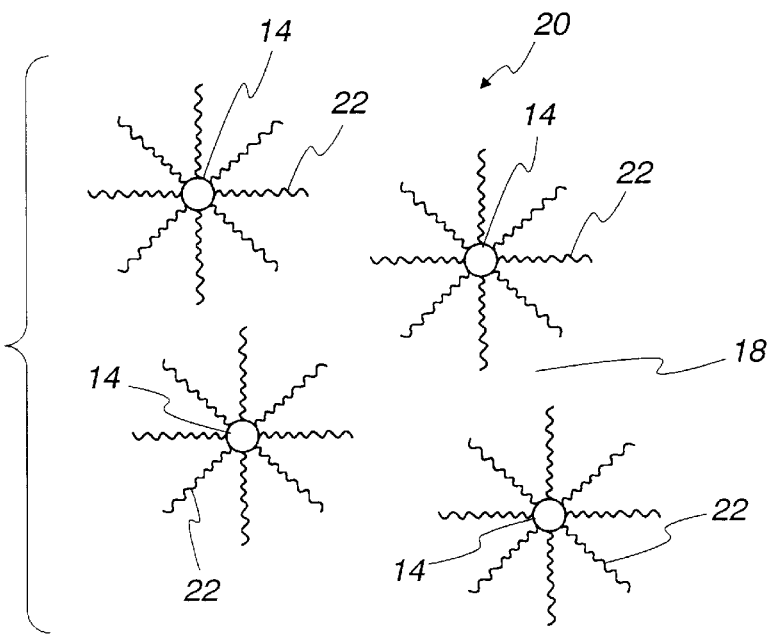
FIG. 4 is a model of a particulate dispersion formed through the dissolution of a membrane and dispersed metal composite in an aqueous solution.

FIG. 3 is a cross-sectional view illustrating a composite 16 that includes particles 14 of a metal and/or its oxide as dispersed in the polymer or oligomer membrane 12. The particles 14 are in the form of a mixture of metal particles and metal oxide particles of, for example, $Cu_2O$, $ZnO$ or $Y_2O_3$. The composite 16 can be dissolved in a solvent 18 to form a particulate dispersion 20 as shown in the model view of FIG. 4. Each particle 14 is surrounded by the membrane polymer or oligomer 22 and is independently dispersed in the aqueous solvent 18. The polymer or oligomer 22 is bonded to the surface of each particle 14 via its functional group.

Figure 5:
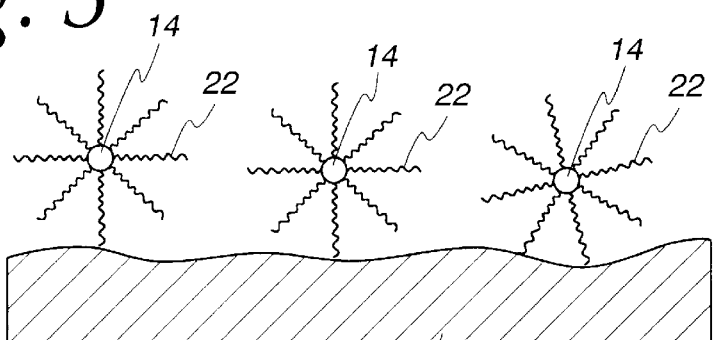
FIG. 5 is a model showing the adsorption of metal particles onto the surface of a carrier via a polymer or oligomer.
Figure 6:
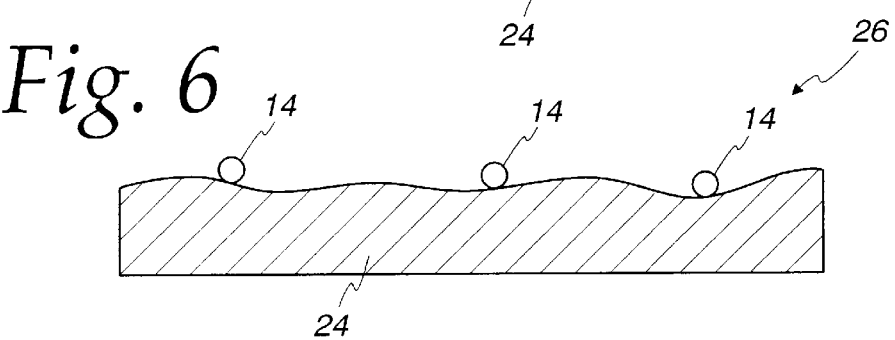
FIG. 6 is a model showing a cross-sectional view of a carrier surface to which a number of metal particles have been fixed.

The invention also contemplates the addition of the particles onto particle-carrying substances. A granular or powdery carrier 24, which has been pre-heated to remove the absorbed water existing on its surface, is put into the particulate dispersion 20 and allowed to stand. As shown by the illustrative model in FIG. 5, the metal particles 14 are absorbed by the carrier 24 on its surface via the polymer or oligomer 22. The color of the surface of the carrier 24 is changed. The polymer or oligomer 22 is chemically bonded to the particles 14 via the functional groups of cyano, amino and/or thiol existing at its terminals or in its side chains while its free end not bonded to the particles 14 bonds to the carrier 24. Even when the carrier 24 as depicted in FIG. 5 is washed with water or kept in solution, the surface color of the carrier 24 does not change and the particles 14 do not drop off from the carrier 24.

The carrier 24 is preferably at least one inorganic oxide selected from silica ($SiO_2$), alumina ($Al_2O_3$), zeolite, titanium oxide, zirconia and heteropoly-acids, and has on its surface active groups to which the polymer or oligomer 22 can bond.

Figure 10:
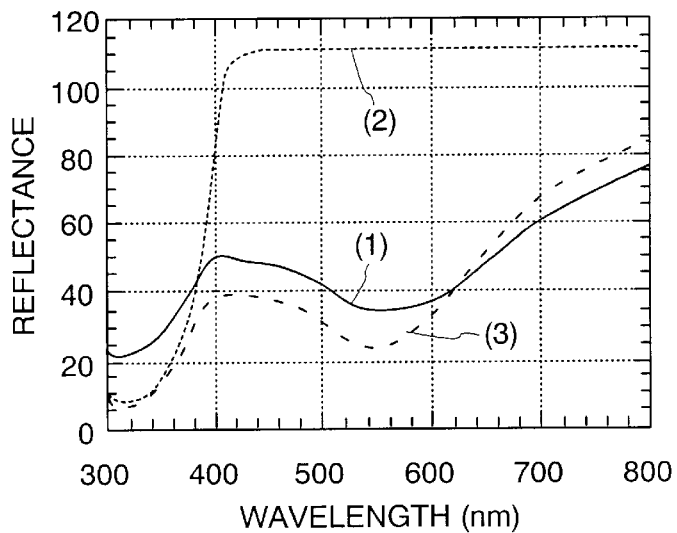
FIG. 10 is the light reflectance spectrum of the powder prepared in Example 2, with titanium oxide powder with gold particles fixed on its surface.

The carrier 24 with the absorbed particles 14 may be baked at a temperature not lower than the decomposition point of the polymer or oligomer 22, whereby the polymer or oligomer 22 is thermally decomposed. This gives a particle-carrying substance 26 in which a number of particles 14 are independently attached onto the surface of the carrier 24 as shown in FIG. 10.

The particles, aqueous dispersion of the particles, and particle-carrying substances thus produced are usable as electroconductive polymer materials and in electroconductive pastes. Additionally, they have other various applications. For example, they are usable as catalysts, since the metal particles have a high catalytic activity and may be stabilized due to their polymer or oligomer coating, and they are also usable in magnetic memory devices as a result of having finely dispersed metal particles. The particles and dispersion also make desirable optical or thermal response members because optical or thermal stimulation will vary both (1) the structure of each polymer or oligomer as bonded to each particle and (2) the distance between the polymer or oligomer and the particle. Since they exhibit a transparent and intrinsic color depending on the type of polymer, oligomer, metal and carrier, they may also be employed in liquid crystal display devices. They may also be sintering promoters and bonding materials because they act to lower the sintering temperature of a powdery metal to be sintered along with them. Finally, their large specific heat capacity enables their implementation in heat-exchange membranes, capacitor materials with large capacity, and various gas sensors.

Now the invention is described in more detail with reference to the following Examples.

EXAMPLE 1

Polyethylene oxide terminated through diamination and having a mean molecular weight of 2000 (as measure through GPC) was dissolved in acetone to prepare a 20 wt. % solution of the polymer. This solution was applied onto a substrate of glass, and dried to give thereon a polyethylene oxide film having a thickness of a few microns.

The glass substrate coated with the polymer film was put into a vacuum vaporization device with an electron beam evaporation source and heated at 60° C. The device was controlled to have a vacuum degree of about $5 \times 10^{-5}$ Torr, and gold put in a crucible in the device was vaporized with electron beams and deposited on the polyethylene oxide film. The degree of vaporization was controlled to give a gold deposit having a thickness of 30 nm, using a quartz oscillator set below the substrate.

The vacuum vaporization device was restored to atmospheric pressure and the polyethylene oxide-coated glass substrate was removed. The gold deposited on the polyethylene oxide was chemically bonded to the amino groups of the polyethylene oxide and held in the polymer in the form of gold particles several nm in size. The polymer film appeared red. In order to attain uniform dispersion of the gold particles in the polymer film, the film-coated substrate was heated at 60° C. in nitrogen.

Figure 7:
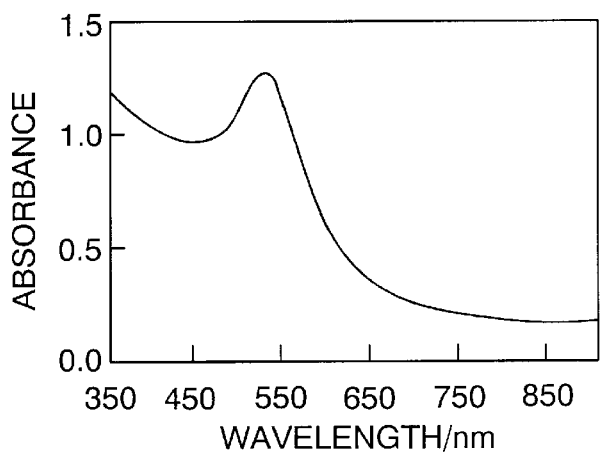
FIG. 7 is the visible ray absorption spectrum of the polymer film as prepared in Example 1, described hereinbelow, the film having gold particles dispersed therein.

FIG. 7 shows a visible ray absorption spectrum of the polymer film having gold particles dispersed within, which verifies that gold particles were dispersed in the polymer film.

The polyethylene oxide film was then peeled from the glass substrate and dipped in water. The polymer was dissolved in the water to give a red aqueous dispersion of gold particles. This dispersion was stable and its red color did not disappear even after one month's time.

Figure 8:
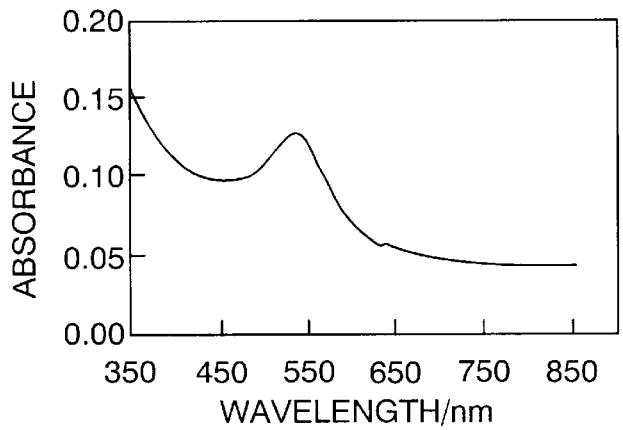
FIG. 8 is the visible ray absorption spectrum of the aqueous dispersion of gold particles as prepared in the same Example 1.

FIG. 8 shows a visible ray absorption spectrum of the aqueous dispersion of gold particles which verifies that gold particles were dispersed in the water.

EXAMPLE 2

Nylon 11 oligomer terminated with cyano groups at both ends and having a mean molecular weight of 700 (as measured through GPC) was mixed with a small amount of meta-cresol to give a paste which was unified by passing it through ink rolls. The paste was printed on a glass substrate using a screen printer, and it was dried at 150° C. for a few minutes to give a nylon 11 oligomer film having a thickness of about 10 microns.

The glass oligomer-coated glass substrate was put into a vacuum vaporization device having an electron beam evaporization source and heated at 55° C. The device was controlled to have a vacuum degree of about $5\times10^{-5}$ Torr, and gold put in a crucible in the device was vaporized with electron beams and deposited on the nylon 11 oligomer film. The degree of vaporization was controlled to give a gold deposit having a thickness of 600 nm, using a quartz oscillator set below the substrate.

The vacuum vaporization device was restored to atmospheric pressure and the nylon 11 oligomer-coated glass substrate was removed. The gold deposited on the nylon 11 oligomer interacted with the cyano groups and the amino groups of the nylon 11 oligomer and held in the oligomer in the form of gold particles several nm in size. The oligomer film appeared dull red or gold. The back surface of the film appeared red through the glass substrate. In order to attain uniform dispersion of the gold particles in the oligomer film, the film-coated substrate was heated at 150° C. for 30 minutes in air. As a result of the heating, the gold color at the film surface disappeared and the film became red as a whole.

Figure 9:
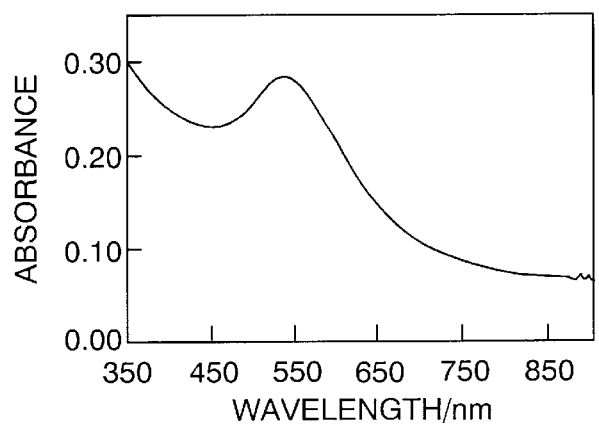
FIG. 9 is the visible ray absorption spectrum of the solution prepared in Example 2, described hereinbelow, with a nylon 11 oligomer containing dispersed gold particles dissolved in meta-cresol.

FIG. 9 shows a visible ray absorption spectrum of a solution of the gold particles-dispersed nylon 11 oligomer as dissolved in meta-cresol.

COMPARATIVE EXAMPLE 1

A polymer film was formed and gold was deposited thereon through vapor deposition in the same manner as in Example 1 except that polyethylene glycol terminated with hydroxyl (—OH) groups was used as the polymer. The gold-deposited polymer film had a golden-colored surface which became more vivid after the film was heated. However, no gold particles were found within the polymer film. When the gold-deposited film was dissolved in water, the aqueous solution did not turn red but rather gave precipitates on its surface.

EXAMPLES 3–6 AND COMPARATIVE EXAMPLE 2

0.05 mols of 11-aminoundecanoic acid and a varying amount of hexamethylenediamine were put into a flask equipped with a condenser, to which was added 67 ml of N-methylpyrrolidine. Then, 43 ml of quinoline and 0.005 mols of triphenyl phophite were added. The flask was dipped in an oil bath. While being stirred, the flask was heated to a temperature falling between 115 and 130° C. and then maintained at that temperature for a predetermined period of time. During the reaction of the flask components, nitrogen gas was introduced. The flask was then cooled to room temperature and the reaction mixture was poured into ethyl acetate. A solid precipitate was collected through filtration. After being washed with ethyl acetate, an aqueous solution of 1 N sodium hydroxide and distilled water, the solid was dried at 60° C.

The solid product was then dissolved in chloroform/m-cresol (4:1 ratio), and its molecular weight was obtained with reference to a standard substance, polystyrene, using a gel permeation chromatography device. Some product was also mixed with potassium bromide and its infrared absorption spectrum was measured using a Fourier transform infrared spectrophotometer to verify the presence of amino bonds and amino groups in the product.

The polyamide thus prepared was mixed with m-cresol to give a mixture having a predetermined viscosity. The mixture was applied onto a glass slide using a spin coater and dried at 80° C. for 30 minutes. Gold was vaporized by resistance heating in a vacuum device containing the polyamide-coated glass slide, and gold deposited on the polyamide film. The degree of gold vaporization was controlled to give a gold deposit having a thickness of 20 nm using a quartz oscillator. Next, the gold-deposited polyamide film was heated in an oven at 140° C. for 10 minutes and the condition of the gold deposit on the film was checked to see whether or not it had dispersed into the film. The results are shown in Table 1.

TABLE 1

|  | Examples | | | | Comparative Example |
|---|---|---|---|---|---|
|  | 3 | 4 | 5 | 6 | 2 |
| 11-Aminoundecanoic acid (mol) | 0.05 | 0.05 | 0.05 | 0.05 | 0.05 |
| Hexamethylenediamine (mol) | 0.025 | 0.025 | 0.025 | 0.025 | 0 |
| Temperature (° C.) | 130 | 130 | 115 | 115 | 130 |
| Time (min) | 180 | 15 | 0 | 0 | 180 |
| Molecular weight (peak) | 2083 | 2184 | 1950 | 1172 | 8706 |
| Dispersion of gold | Found | Found | Found | Found | Not found |

From the results, it is understood that the gold deposited on the synthetic polyamide having a low molecular weight and terminated with amino groups dispersed in the polymer film.

EXAMPLE 7

The nylon 11 oligomer film with dispersed gold particles produced in Example 2 was peeled from the glass substrate. 50 mg of the film was dissolved in 2 ml of dichloromethane to give a red particulate dispersion of gold colloids. FIG. 9 shows a visible ray absorption spectrum of a solution of the oligomer as dissolved in meta-cresol.

One g of Molecular Sieves 4A which had been heated at 200° C. for 1 hour was added to the particulate dispersion and left for one day. The surface of the Molecular Sieves 4A became black after having absorbed the gold particles, while the red color of the supernatant of the resulting particulate dispersion became paled as compared with that of the original particulate dispersion.

The Molecular Sieves 4A was taken out through filtration and washed several times with dichloromethane. After the washing, the color of the Molecular Sieves 4A did not change. The Molecular Sieves 4A with the absorbed gold particles was heated at 500° C. for 15 minutes in air, using a muffle furnace. As a result, the nylon 11 oligomer that had surrounded the gold particles was thermally decomposed and only the gold particles were fixed on the surface of the Molecular Sieves 4A. The surface of the Sieves was red.

EXAMPLE 8

The nylon 11 oligomer film with dispersed gold particles produced in Example 2 was peeled from the glass substrate.

50 mg of the film was dissolved in 2 ml of dichloromethane to give a red particulate dispersion of gold colloids.

500 g of titanium oxide powder (AEROSIL T805, manufactured by Nippon Aerosil Co.), which had been heated at 200° C. for 1 hour, was added to the particulate dispersion and left for one day. The surface of the titanium dioxide powder became reddish violet after absorbing the gold particles, while the red color of the supernatant of the resulting particulate dispersion disappeared.

The titanium oxide powder was taken out through filtration and washed several times with dichloromethane. After the washing, the color of the titanium oxide powder did not change. The titanium oxide powder with the absorbed gold particles was heated at 500° C. for 15 minutes in air, using a muffle furnace. As a result, the nylon 11 oligomer that had surrounded the gold particles was thermally decomposed and only the gold particles were fixed on the surface of the titanium oxide powder. The surface of the powder was bluish violet.

FIG. 10 shows a light reflectance spectrum of the titanium oxide powder with gold particles fixed on its surface, verifying the fixation. For reference, a light reflectance spectrum of titanium oxide alone and that of titanium oxide which absorbed on its surface a dispersion of gold particles in nylon 11 oligomer are shown.

EXAMPLE 9

A polyamide similar to that of Example 3 was prepared with the exception that the degree of gold vaporization was controlled to give a gold deposit having a thickness of 10 nm using a quartz oscillator. The gold-deposited polyamide film was heated in an oven at 140° C. for 10 minutes. The film was dissolved in meta-cresol to give a transparent blue dispersion with no precipitate formed therein. Thus, it was found that the gold particles were protected by the polyamide and stably dispersed in the dispersion.

500 g of titanium oxide powder (AEROSIL T805, manufactured by Nippon Aerosil Co.), which had been heated at 200° C. for 1 hour, was added to the colloidal dispersion and left for one day. The titanium powder was taken out of the dispersion, put onto a glass slide and dried thereon to remove any meta-cresol. A thin film of pale reddish powder formed on the slide. The powder was heated in air at 500° C. for 15 minutes, using a muffle furnace. The polyamide that had surrounded the gold particles was thermally decomposed and only the gold particles were fixed to the surface of the titanium dioxide powder. The surface of the titanium dioxide powder became reddish violet.

Using an integrating sphere device, the visible ray absorption spectrum of the powder was measured. In FIG. 11, the plasmon resonance absorption of gold is indicated by the arrow. The peak existing to the right of the arrow indicates the noise of the device used.

This invention has been described in terms of specific embodiments set forth in detail, but it should be understood that these are illustrative and that the invention is not necessarily so limited. Modifications and variations will be apparent from this disclosure and do not depart from the spirit of this invention, as those skilled in the art will readily understand. Accordingly, such variations and modifications of the disclosed invention are considered to be within the scope of this invention and the following claims.

What is claimed is:

1. A method for producing a particulate dispersion comprising the steps of:

forming a membrane of a polymer or oligomer, the polymer or oligomer comprising at least one of terminal end groups and side chains, the at least one of the terminal end groups and side chains comprising at least one functional group selected from the group consisting of cyano, amino and thiol groups;

depositing one or more metal particles on the membrane through vapor deposition;

heating the membrane so that the membrane has one or more particles of the metal dispersed therein to provide a composite; and dissolving the composite in water or in a solvent miscible with water to provide the particulate dispersion having membrane polymer or oligomer bonded to the surface of the one or more metal particles.

2. The method for producing the particulate dispersion according to claim 1 in which the metal to be deposited is a noble metal.

3. The method for producing the particulate dispersion according to claim 1 wherein the step of forming a membrane comprises the step of applying, onto a substrate, a paste of the polymer or oligomer dissolved in an organic solvent.

4. The method for producing the particulate dispersion according to claim 1, wherein the step of heating the membrane further comprises heating the membrane to a temperature in the range between 40° C. lower than the melting temperature of the polymer or oligomer and 10° C. higher than the melting temperature of the polymer or oligomer to disperse the particles of metal or its oxide in the membrane.

5. The method for producing the particulate dispersion according to claim 1, wherein the step of heating the membrane further comprises heating the membrane to a temperature in the range between 10° C. lower than the melting temperature of the polymer or oligomer and 5° C. higher than the melting temperature of the polymer or oligomer to disperse the particles of metal or its oxide in the membrane.

6. A method for producing metal particles comprising the steps of:

forming a synthetic polyamide through polymerization to have a molecular weight of from 400 to 7000, dissolving said polyamide in a solvent, and filming said polyamide onto a substrate; and depositing a metal onto said polyamide through vapor deposition so that said polyamide has particles of the metal or its oxide dispersed therein.

7. The method for producing metal particles according to claim 6 in which the synthetic polyamide having a molecular weight between 400 and 7000 is formed through polymerization of an amino acid monomer of the formula $H_2N$—$(CH_2)_n COOH$, where n is from 1 to 36, with at least one polymerization inhibitor in the presence of a catalyst, said polymerization inhibitor being selected from the group consisting of amines or polyamines having an amino group at the terminal(s) of their molecule and represented by the formula R—$(CH_2)_m$—$NH_2$, where m is from 1 to 36 and R is a group selected from $CH_3$—, cyano, amino and thiol groups, and amines or polyamines of the same formula but having in their side chains at least one or more functional groups selected from the group consisting of cyano, amino and thiol groups.

8. A method for producing a metal particulate dispersion comprising the steps of:

forming a membrane of a polymer or oligomer which has, at the terminal of its molecule or in the side chains thereof, at least one functional group selected from the group consisting of cyano, amino and thiol groups, and of which a skeleton of the polymer or oligomer is soluble in water, the skeleton selected from the group consisting of polyethylene oxide, polyethylene glycol and polyvinyl alcohol;

depositing a metal on the membrane through vapor deposition to cause the membrane to have particles of the metal or its oxide dispersed therein; and dissolving the resulting composite in water or in a solvent miscible with water.

9. The method for producing the particulate dispersion according to claim 8, wherein the step of dissolving the resulting composite in water or in a solvent miscible with water provides one or more metal particles surrounded by the membrane polymer or oligomer, the polymer or oligomer bonded to the surface of the one or more metal particles.

10. A method for producing a metal particle-carrying substance comprising the steps of:

forming a membrane of a polymer or oligomer which has, at the terminals of its molecule or in the side chains thereof, at least one functional group selected from the group consisting of cyano, amino and thiol groups, and of which a skeleton of the polymer or oligomer is soluble in water, the skeleton selected from the group consisting of polyethylene oxide, polyethylene glycol and polyvinyl alcohol;

depositing a metal on the membrane through vapor deposition to cause the membrane to have particles of the metal or its oxide dispersed therein;

dissolving the resulting composite in a solvent to produce a metal particulate dispersion; and placing a carrier into said metal particulate to absorb the metal particles via the polymer or oligomer.

11. The method for producing a metal particle-carrying substance according to claim 10 further including the step of heating the carrier having the particles absorbed thereon via the polymer or oligomer at a temperature not lower than the decomposition point of the polymer or oligomer.

12. The method for producing a metal particle-carrying substance according to claim 11 in which the polymer or oligomer is a synthetic polyamide with a molecular weight between 400 and 7000 prepared through polymerization of an amino acid monomer of the formula $H_2N—(CH_2)_nCOOH$, where n is from 1 to 36, with at least one polymerization inhibitor in the presence of a catalyst, said polymerization inhibitor being selected from
amines or polyamines having an amino group at the terminal(s) of their molecule and represented by the formula $R—(CH_2)_m—NH_2$, where m is from 1 to 36, and R is a group selected from the group consisting of $CH_3—$, cyano, amino and thiol groups, or aminos or polyamines of the same formula but having in their side chains at least one or more functional groups selected from the group consisting of cyano, amino and thiol groups.

13. The method for producing a particle-carrying substrate according to claim 10 in which the carrier is at least one inorganic oxide selected from the group consisting of silica, alumina, zeolite, titanium oxide, zirconia and heteropoly-acids.

14. A method for producing a metal particle-carrying substance comprising the steps of:

forming a membrane of a polymer or oligomer, wherein the polymer or oligomer is a synthetic polyamide with a molecularweight between 400 and 7000 prepared through polymerization of an amino acid monomer of the formula $H_2N—(CH_2)_nCOOH$, where n is from 1 to 36, with at least one polymerization inhibitor in the presence of a catalyst, said polymerization inhibitor being selected from the group consisting of amines or polyamines having an amino group at the terminal(s) of their molecule and represented by the formula $R—(CH_2)_m—NH_2$, where m is from 1 to 36 and R is a group selected from $CH_3—$, cyano, amino and thiol groups, and amines or polyamines of the same formula but having in their side chains at least one or more functional groups selected from the group consisting of cyano, amino and thiol groups;

depositing a metal on the membrane through vapor deposition to cause the membrane to have particles of the metal or its oxide dispersed therein;

dissolving the resulting composite in a solvent to produce a metal particulate dispersion; and placing a carrier into said metal particulate to absorb the metal particles via the polymer or oligomer.

* * * * *